United States Patent
Lin et al.

(10) Patent No.: US 9,120,231 B2
(45) Date of Patent: Sep. 1, 2015

(54) RECONFIGURABLE ROBOT END-EFFECTOR ASSEMBLY

(71) Applicant: GM GLOBAL TECHNOLOGY OPERATIONS LLC, Detroit, MI (US)

(72) Inventors: Yhu-Tin Lin, Rochester Hills, MI (US); Roland J. Menassa, Macomb, MI (US); Joerg Pohlers, Riedstadt (DE); Lutz Renger, Bad Kreuznach (DE); Joseph J. Ekl, Jr., Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/285,005

(22) Filed: May 22, 2014

(65) Prior Publication Data
US 2014/0356049 A1 Dec. 4, 2014

Related U.S. Application Data

(60) Provisional application No. 61/828,808, filed on May 30, 2013.

(51) Int. Cl.
*B25J 15/00* (2006.01)
*B25J 15/06* (2006.01)

(52) U.S. Cl.
CPC .......... *B25J 15/0061* (2013.01); *B25J 15/0616* (2013.01); *Y10T 403/32057* (2015.01)

(58) Field of Classification Search
CPC .......................... B25J 15/0061; B25J 15/0616
USPC ............................................... 414/797, 752.1
See application file for complete search history.

(56) References Cited

U.S. PATENT DOCUMENTS

| | | | | |
|---|---|---|---|---|
| 5,704,729 A | * | 1/1998 | Carnahan et al. | 403/322.1 |
| 6,409,001 B1 | | 6/2002 | Kerr | |
| 8,162,557 B2 | * | 4/2012 | Van Zile et al. | 403/96 |
| 8,496,425 B2 | * | 7/2013 | Lin et al. | 414/729 |
| 8,684,418 B2 | * | 4/2014 | Lin et al. | 285/147.1 |
| 2011/0176865 A1 | | 7/2011 | Colby et al. | |
| 2011/0182655 A1 | | 7/2011 | Lin et al. | |
| 2012/0280526 A1 | * | 11/2012 | Lin | 294/183 |
| 2012/0280527 A1 | * | 11/2012 | Lin et al. | 901/30 |

FOREIGN PATENT DOCUMENTS

| | | |
|---|---|---|
| CN | 2250671 Y | 4/1994 |
| CN | 102765091 A | 11/2012 |
| EP | 1020259 A1 | 7/2000 |
| WO | 2012163390 A1 | 12/2012 |
| WO | WO 2012163390 A1 * | 12/2012 |

* cited by examiner

*Primary Examiner* — Gerald McClain
(74) *Attorney, Agent, or Firm* — Quinn Law Group, PLLC

(57) ABSTRACT

A reconfigurable end-effector assembly includes a master boom, a limb, and branches. The branches extend radially outward from the limb. Tandem branch joint assemblies connect the branches to the limb, and include a first and a second branch joint each having a cam lock. Tool modules mounted to the branches are translatable and rotatable with respect to the branches. The joint assemblies rotate and slide with respect to the longitudinal axis of the limb only when the cam lock is released. A configuration tool has an actuator and fingers. The branch joints define openings that are engaged via the fingers. The tool includes a latch which engages the cam lock, and clamps and unclamps the cam lock. A flexible dress package is mountable to the limb and configured to route lengths of conduit to each of the tool modules.

11 Claims, 4 Drawing Sheets

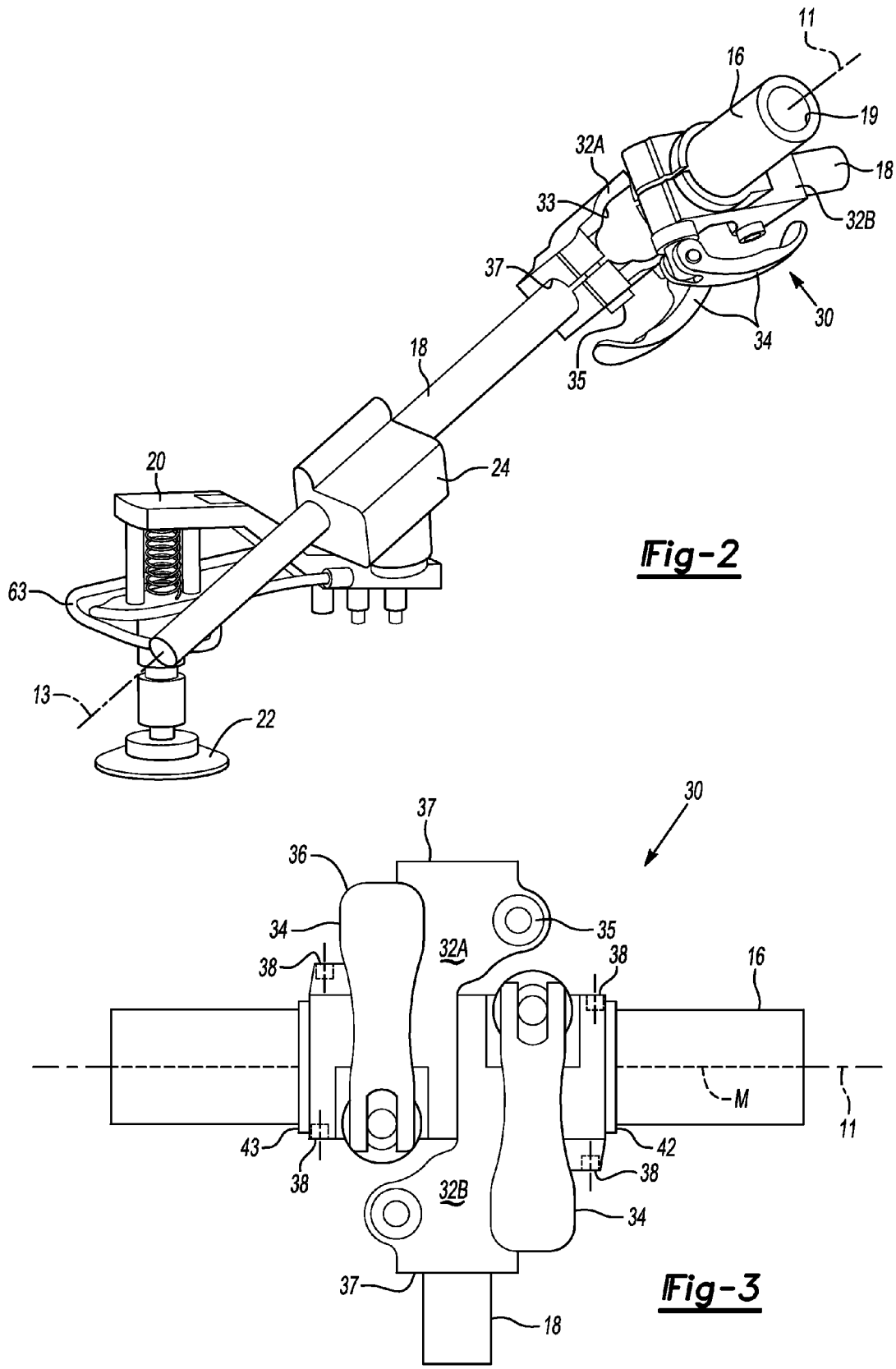

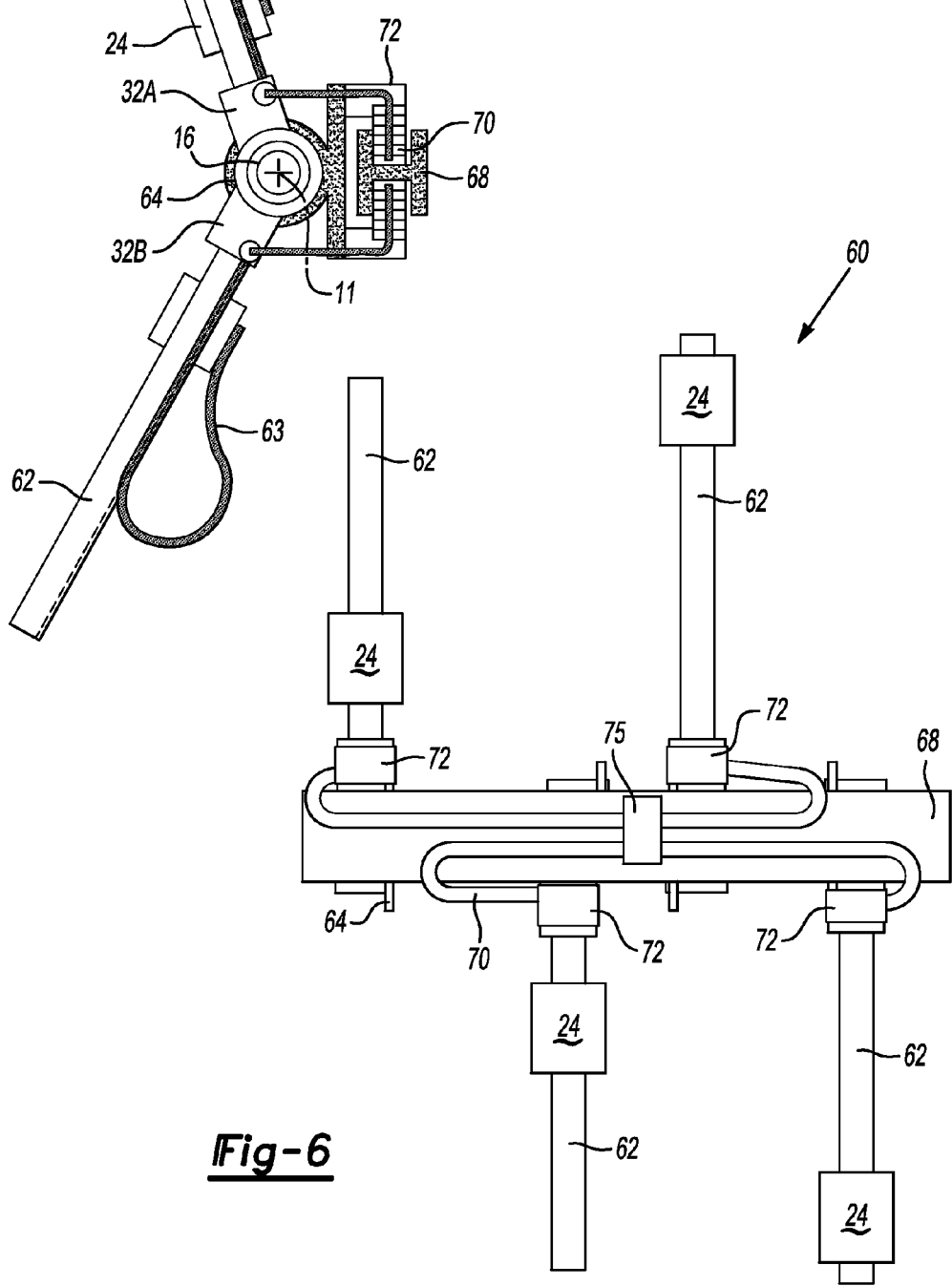

RECONFIGURABLE ROBOT END-EFFECTOR ASSEMBLY

CROSS-REFERENCE TO RELATED APPLICATIONS

This application claims the priority benefit of U.S. Provisional Application No. 61/828,808, filed on May 30, 2013, which is hereby incorporated by reference in its entirety.

TECHNICAL FIELD

The present disclosure relates to a reconfigurable robot end-effector assembly.

BACKGROUND

Robot end-effectors are used in various manufacturing processes to perform work on a given workpiece. End-effectors may include tool modules with end tools which, depending on the design, can grip, transport, orient, and release the work piece. Certain end-effectors include a main boom, which is grasped and moved as needed by a material handling robot. The limbs of the end-effector extend outward from the main boom. Multiple branches extend radially outward from the limbs to form an array of tool modules.

The individual tool modules and end tools may be manually adjusted to a desired location and orientation prior to performing a work task. Such end-effectors may facilitate manufacturing processes. However, conventional designs for interconnecting the various limbs and branches, as well as for routing power to the end tools, may remain less than optimal with respect to packaging size, adjustability, and weight.

SUMMARY

An end-effector assembly as disclosed herein is intended to address the aforementioned problems, in part via the use of lightweight tandem branch joint assemblies, each of which utilizes a pair of cam locks having respective handles. The pair of cam locks forms an eccentric joint enabling relatively quick locking/unlocking and repositioning of the various branches of an end-effector assembly.

The end-effector assembly may include a configuration tool having an actuator. The actuator may be used to directly engage the cam lock handles and the two branch joints of each tandem branch joint assembly. The configuration tool automatically releases the cam locks, and to thereafter rotates and/or linearly positions the branch joints with respect to a given limb, with the particular configuration determined by the design of the workpiece.

Additionally, a flexible dress package may also be included which routes pneumatic tubes or other flexible conduit to each of the end tools. Unlike prior art packages, the flexible dress package of the present invention does so without carrying the structural load of the branches.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 2 is a schematic perspective view illustration of a branch portion of the end-effector assembly of FIG. 1.

FIG. 3 is schematic perspective view illustration of an example tandem branch joint assembly as shown in FIG. 2.

FIG. 5 is a schematic side view illustration of a flexible dress package usable with the reconfigurable end-effector assembly of FIG. 1.

FIG. 6 is a schematic plan view illustration of the flexible dress package shown in FIG. 5.

DETAILED DESCRIPTION

Figure 1:
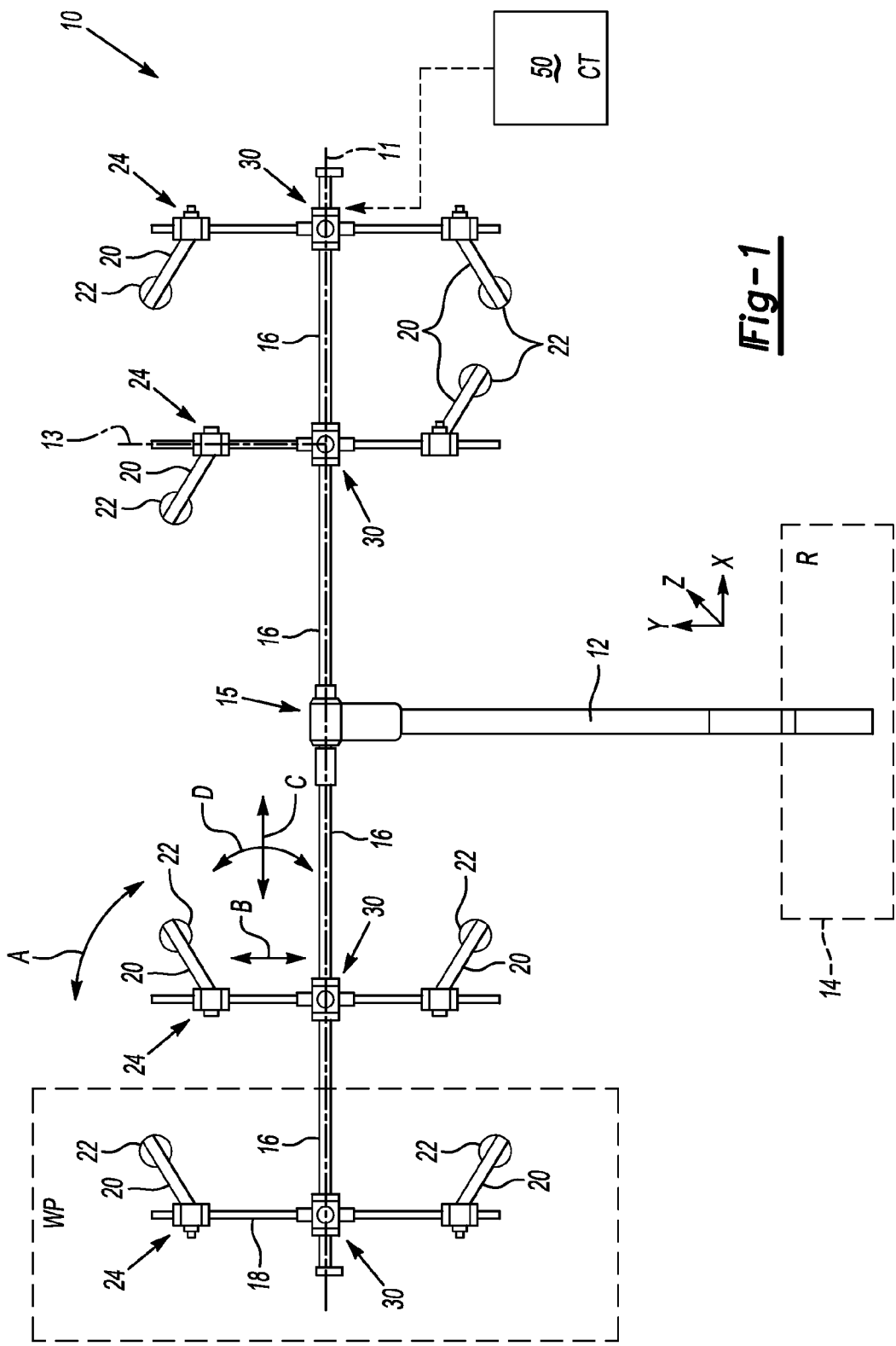
FIG. 1 is a schematic plan view illustration of a reconfigurable end-effector assembly having a plurality of configurable tool modules and a configuration tool in accordance with the present disclosure.
Figure 4:
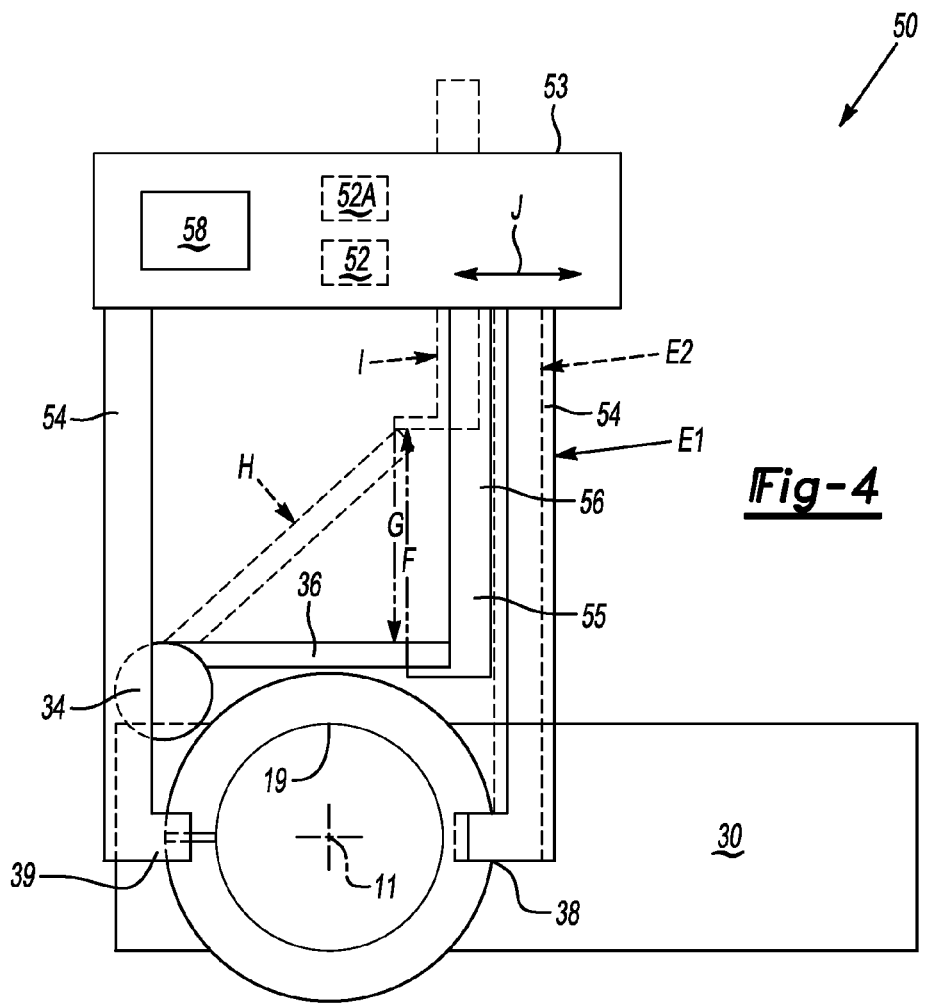
FIG. 4 is a schematic plan view illustration of an example embodiment of the configuration tool shown in FIG. 1.

Referring to the drawings, wherein like reference numbers refer to like components throughout the several Figures, a reconfigurable end-effector assembly 10 is shown schematically in FIG. 1. The end-effector assembly 10 includes a master boom 12 which is connected, via a T-fitting 15 or other suitable connector, to a limb 16 having a longitudinal axis 11. The limb 16 may have an inner wall 19 as shown in FIGS. 2 and 4. The master boom 12 may be positioned anywhere in a Cartesian (xyz) frame of reference, i.e., in free space, as needed by a robot (R) 14, for instance a multi-axis material handling robot of the type typically used for logistical purposes in a manufacturing facility. As is well understood in the art, such a robot 14 may be programmable, fixed to a stationary or a moveable base, and configured to position the master boom 12 as needed with respect to a workpiece (WP).

A limb 16 of the end-effector assembly 10 extends orthogonally with respect to the master boom 12 via the T-fitting 15 and provides the necessary transverse structural support for a plurality of branches 18. Each of the branches 18 supports a tool module 20, with each tool module 20 including an end tool 22. The branches 18 may be attached to the limb 16 in a cantilever manner. As described herein, the branches 18 with the attached tool modules 20 are moveable, and thus may be arranged as desired to permit the end tools 22 to attach to or otherwise interact with the workpiece (WP), e.g., a pane of glass, a structural body panel, or the like.

In keeping with the non-limiting body panel example, the corresponding end tools 22 are shown throughout the various Figures as pneumatic suction cups of the type used to secure and move automotive or other body panels without marring the finished show surfaces thereof. However, other end tools 22 may be readily envisioned within the intended scope of the present invention, such as pinchers, clamps, spray nozzles, etc., and therefore the particular construction of the end tools 22 may vary.

The tool modules 20 shown in FIG. 1 are connected to a corresponding branch 18 via a linear/rotatable locking mechanism 24, i.e., any device or mechanism which allows the tool modules 20 to be locked in place in both a rotational (arrow A) and linear (arrow B) direction with respect to a longitudinal axis 13 of the branch 18, and selectively unlocked in either direction to allow translation or rotation of the tool module 20 with respect to the branch 18. An example locking mechanism that may be suitable for use as the locking mechanism 24 is disclosed, for instance, in Lin et al. (US 2011/0182655), which is hereby incorporated by reference in its entirety. Each branch 18 extends radially outward from the longitudinal axis 11 of limb 16. In turn, the various branches 18 are connected to the limb 16 via a corresponding tandem branch joint assembly 30.

The tandem branch joint assembly 30, the structure of which is described in further detail below with reference to FIGS. 2 and 3, allows for quick adjustment and repositioning of each of the branches 18 with respect to the axis 11 of limb 16, as indicated by arrows C and D in FIG. 1, either manually or via a configuration tool (CT) 50. An example of such a configuration tool 50 is described below with reference to FIG. 4. Each tandem branch joint assembly 30 joins different branches 18 to the limb 16 in an eccentric configuration. The configuration tool 50 of FIG. 4 can directly interface with a given tandem branch joint assembly 30 to selectively unlock the tandem branch joint assembly 30 and reposition the branches 18 as needed, or an operator could manually accomplish this task.

FIG. 2 depicts a separated branch segment of the end-effector assembly 10 of FIG. 1 along axis 13, i.e., from the tandem branch joint assembly 30 to the tool module 20. The tandem branch joint assembly 30 is locked into a desired orientation with respect to the axis 13 via the locking mechanism 24. Flexible conduit 63, e.g., pneumatic tubing or hose, allows a force to be delivered to the end tool 22, in this instance a vacuum provided via an end tool 22 in the form of a suction cup. In other embodiments, the conduit 63 may provide electrical power or hydraulic fluid power. The tandem branch joint assembly 30 is likewise locked into a desired orientation with respect to the axis 11 of the limb 16.

The term "tandem" specifically refers to the use of two identical but inversely-oriented, eccentric branch joints 32A and 32B. The branch joints 32A and 32B are positioned or configured independently, but can be coupled into an integral tandem unit described below. Each branch joint 32A and 32B includes a pair of inner walls 33 and 37 each defining an opening within which the limb 16 and branch 18 are respectively received. The branch joints 32A, 32B are then securely clamped to the branch 18 via a fastener 35. A cam lock 34 is provided at each of the branch joints 32A, 32B, i.e., two cam locks 34 per tandem branch joint assembly 30, to thereby securely clamp the branch joints 32A and 32B to the limb 16.

When clamped, the cam locks 34 securely lock the tandem branch joint assembly 30 to the limb 16 in the axial and rotational directions. The tandem branch joint assembly 30 may be simply unclamped via actuation of the cam locks 34 to allow the tandem branch joint assembly 30 to freely slide along or rotate about the axis 11, i.e., respective arrows C and D in FIG. 1. Although omitted from FIG. 2 for simplicity, the inner walls 33, 37 may be provided with a friction interface such as a knurl pattern, splines, or friction material so as to minimize the chance that, over time, a clamped cam lock 34 may still move with respect to the axis 11.

Referring to FIG. 3, the tandem branch joint assembly 30 is shown in a clamped position relative to a portion of the limb 16. Optional homing markers (M) may be marked or scribed on various surfaces of the end-effector assembly 10 of FIG. 1, shown here as along the limb 16, so as to facilitate reconfiguration in certain instances. Configuring the end-effector assembly 10 to the homing markers (M) of FIG. 3 may be manually accomplished. Therefore, the homing markers (M) should be easy to identify to a human operator, with placement such as at physical limits of a range of travel of any joint, and/or at positions that are free from interference with other parts of the end-effector assembly 10. The homing markers (M) provide reference lines or points for quickly resetting all of the joints of the end-effector assembly 10 to a desired configuration, which may be particularly useful after a build cycle or tool crash. In some embodiments, machine vision may be used to image the homing markers (M) so as to automate the reconfiguration process, or an operator can also use the homing markers (M) to manually reconfigure the set up.

Figure 3A:
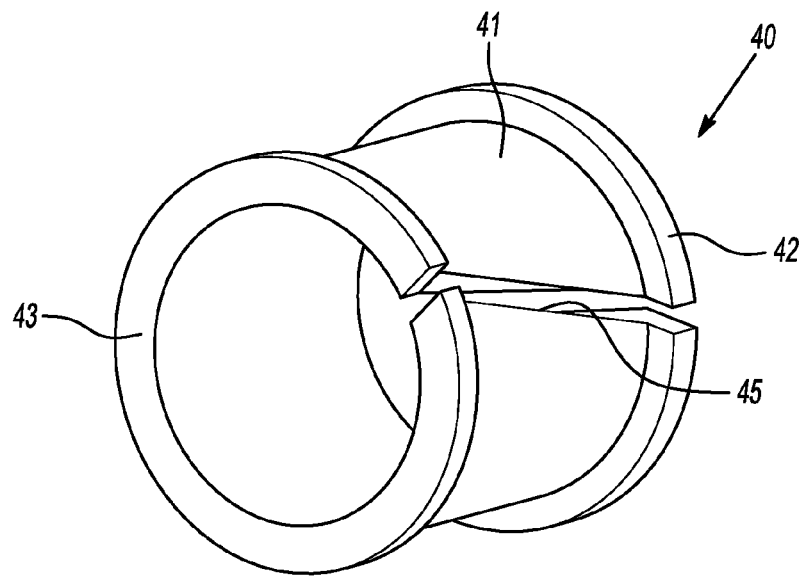
FIG. 3A is a schematic perspective view illustration of a flexible snap-in sleeve that is usable with the tandem branch joint assembly of FIG. 3 to join separate eccentric branch joints.

Referring to FIG. 3A, the tandem branch joint assembly 30 of FIG. 3, although constructed of separate branch joints 32A and 32B, may form an integral tandem unit via use of a flexible snap-in sleeve 40. The flexible snap-in sleeve 40 may include a pair of flanges 42, 43 of a flexible rubber or polymer material, with the flanges 42, 43 separated by a length of annular side wall 41. The annular side wall 41 may cut as shown to define an angled slot 45. The presence of the slot 45 allows the flanges 42 and 43, the sides of which are visible in the view of FIG. 3, to partially collapse when the side wall 41 is compressed. This in turn allows the sleeve 40 to pass through the tandem branch joint assembly 30. The sleeve 40, being resilient, springs back into the generally cylindrical shape of FIG. 3A once the flange 43 is entirely through the branch joints 32A and 32B, with the flanges 42 and 43 flanking the branch joints 32A, 32B. When the cam locks 34 are unlocked, each branch joint 32A and 32B can articulate independently on the limb 16 while still linearly translating together along axis 11.

Referring to FIG. 4, the end-effector assembly 10 of FIG. 1 may be automatically adjusted via the configuration tool 50 as noted above. In an example embodiment, the configuration tool 50 includes an actuator housing 53 with actuators 52 and 52A, which impart motion as indicated by arrow J and/or arrows F and G as set forth below. The configuration tool 50 may include a logic board 58, actuating fingers 54 moved via the actuator 52, and a cam latch 55 that moves via actuator 52A, and which engages the handle 36 of the cam lock 34. The actuators 52 and 52A may be any pneumatic, hydraulic, or electro-mechanical device configured to impart a force to the actuating fingers 54 and the cam latch 55, for instance rotatory ball screws or other linear or rotary actuators.

A robot (not shown) moves the configuration tool 50 into position with respect to a given branch joint 32A or 32B, and, via signals issued to the logic board 58, selectively closes the actuating fingers 54 via the actuator 52. The partially-closed and fully-closed positions are shown via the respective solid and broken lines at E1 and E2 in FIG. 4. Continued motion away from the branch joint 32A or 32B moves the actuating fingers 54 into a fully open position, i.e., disengaged from the branch joint 32A or 32B. The actuator 52 moves the actuating fingers 54 far enough to clear the branch joint 32A or 32B, then closes the actuating fingers 54 to grasp the branch joint 32A or 32B. An end 39 of the actuating fingers 54 enters the locator opening 38 to directly engage the particular branch joints 32A or 32B. In an alternative embodiment, only one of the actuating fingers 54 moves while the other remains fixed, a configuration that may reduce complexity without sacrificing much in the way of the demonstrated pincher functionality.

The cam latch 55 of FIG. 4 may be generally L-shaped as shown or otherwise sufficiently shaped to receive and engage the handle 36 of the cam lock 34. An arm 56 may be connected to or formed integrally with the cam latch 55 and extend to another actuator 52A within the actuator housing 53. During end-effector configuration, the actuator 52 partially closes the actuating fingers 54 such that the end 39 of each actuating finger 54 enters the locator opening 38 to partially engage the particular branch joint 32A or 32B. In turn, the cam latch 55 and the connected arm 56 move to engage the handle 36 of the cam lock 34. The other actuator 52A then moves the cam latch 55 and the connected arm 56 vertically to position I, and thus the handle 36 of the cam lock 34 to position H, i.e., toward the actuator 52A (arrow F) to unlock the branch joint 32A or 32B for end-effector reconfiguration.

To reconfigure the tandem branch joint assembly 30, the actuating fingers 54 are then fully closed by the actuator 52 for secure grasping and moving of the branch joint 32A or 32B while the configuration tool 50 is rotated and translated via a material handling robot (not shown). At the desired branch joint position, the actuator 52A drives the cam latch 55 and the connected arm 56 in the direction of arrow G and thereby moves the handle 36 of the cam lock 34 to a locking position, and thereby locks the branch joint 32A or 32B.

Referring to FIGS. 5 and 6, a flexible dress package 60 is shown in side and top (plan) views, respectively. The dress package 60 may be used with the end-effector assembly 10 of FIG. 1 to house and route lengths of flexible conduit 63 to the various end tools 22 (see FIGS. 1 and 2). The conduit 63 conducts the necessary vacuum, compressed air, hydraulic fluids, or electricity to the end tools 22, depending on the particular construction, for activating the end tools 22. The conduit 63 may be provided in suitable lengths that permit a sufficiently wide range of motion. Unlike prior art flexible dress packages, the design of FIGS. 5 and 6 does not carry the structural load of the various branches 18, instead providing only the necessary support for flexible and rigid carriers 70, 72, respectively.

As best shown in FIG. 5, the limb 16 may be circumscribed by a boom sleeve 64. Branch rails 62 radiate outward from the branch joint 32A or 32B, with each branch rail 62 defining a U-channel 61 within which the conduit 63 is received. The locking mechanism 24 is positioned along a given branch 18 (see FIG. 1) with respect to the branch rails 62 separate from the flexible dress package 60, with the end of the conduit 63 terminating at the corresponding end tool 22 (see FIG. 1) disposed near the locking mechanism 24.

An I-beam 68 extends parallel to the axis 11 of the limb 16 shown in FIG. 1 and supports the flexible carrier 70 and rigid carrier 72, with the rigid carrier 72 surrounding/circumscribing a given tandem branch joint assembly 30. Thus, the carriers 70, 72 are allowed to move linearly along a branch 18 (see FIG. 1), but the carriers 70, 72 do not rotate in conjunction with an articulation of the branch 18 (see FIG. 2).

The flexible and rigid carriers 70 and 72, respectively, are shown in FIG. 6 with respect to the I-beam 68. Cable track constructed of nylon or other rigid, wear-resistant material is a particular type of flexible carrier 70 that may be used with the flexible dress package 60, although any other design could be used that is capable of receiving the conduit 63 therein and shielding it from damage without restricting its motion. The conduit 63 housed within the flexible carrier 70 may be routed to a central manifold 75, e.g., a pneumatic manifold in the example of suction cups used for the end tools 22 of FIG. 1. Such a manifold 75 may be used to route the conduit 63 to the various points of use. Use of the manifold 75 also allows the flexible carrier 70 of each branch 18 to be about half of the length of the I-beam 68.

The end-effector assembly 10 as described herein, whether automatically configured via the configuration tool 50 of FIGS. 1 and 4 or manually configured, thus provides the benefit of a quick release, light weight clamping joint design. The present design retains advantages of existing branch and limb-type end-effectors. In an automated production line, where one material handling robot typically services one station, end-effector reconfiguration may be achieved via batch or mixed runs. For a batch run, with longer time periods available during the changeover from one batch of parts to another, each robot can park its end-effector assembly 10 on a passive reconfiguration stand (not shown).

Once parked, the robot can pick up a configuration tool 50 (see FIG. 4) and reconfigure the end-effector assembly 10. Another configuration tool may be used to reconfigure the locking mechanism 24, for instance as described in US2011/0182655, which is hereby incorporated by reference in its entirety. If time allows, one or more stands on a sliding rail may serve all of the robots. For mixed runs, the changeover is, at most, one cycle time to keep production flowing. Here, the robot may place the end-effector assembly 10 in an active configuration stand (not shown), with such a stand having a set of configuration tools 50 that can configure all tandem branch joint assemblies 30 automatically and simultaneously in a short period of time.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A reconfigurable end-effector assembly, comprising:
a master boom having an end;
a limb that is arranged orthogonally with respect to the master boom, and that is rigidly connected to the end of the master boom;
a plurality of branches extending radially outward from the limb;
a plurality of tandem branch joint assemblies each connecting at least two of the branches to the limb, wherein each of the tandem branch joint assemblies includes first and second branch joints, and wherein each of the first and second branch joints includes a releasable cam lock;
a plurality of tool modules each mounted to, and selectively translatable and rotatable with respect to, a corresponding one of the branches; and
a configuration tool having an actuator and a pair of actuating fingers that are moveable via the actuator, wherein the first and second branch joints define locator openings that are engaged via the pair of actuating fingers;
wherein each of the tandem branch joint assemblies rotates and slides with respect to a longitudinal axis of the limb only when the cam lock is released,
the configuration tool includes a cam latch which is moveable via the actuator and engages one of the cam locks, and a movement of the cam latch in respective first and second directions clamps and unclamps the cam lock.

2. The reconfigurable end-effector assembly of claim 1, further comprising a flexible snap-in sleeve positioned within one of the tandem branch joint assemblies, wherein the flexible snap-in sleeve has a pair of flanges which retains the first and second branch joints to each other.

3. The reconfigurable end-effector assembly of claim 1, wherein the plurality of tool modules includes a pneumatic suction cup.

4. The reconfigurable end-effector assembly of claim 1, further comprising a flexible dress package and flexible conduit, wherein the flexible dress package has a boom sleeve that circumscribes the limb and routes the flexible conduit to each of the tool modules.

5. The reconfigurable end-effector assembly of claim 4, wherein the flexible dress package further includes a branch rail defining a U-channel which receives a corresponding one of the flexible conduits.

6. The reconfigurable end-effector assembly of claim 4, wherein the flexible dress package includes a manifold to which is routed all of the flexible conduits.

7. A reconfigurable end-effector assembly, comprising:
a master boom having an end;
a limb arranged orthogonally with respect to the master boom, and rigidly connected to the end of the master boom;
a plurality of branches extending radially outward from the limb;
a plurality of tandem branch joint assemblies each connecting at least two of the branches to the limb, wherein each of the tandem branch joint assemblies includes a first and a second branch joint, and wherein each of the first and second branch joints includes a cam lock, and each of the tandem branch join assemblies is further configured to rotate and slide with respect to the longitudinal axis of the limb only when the cam lock is released;
a plurality of tool modules each mounted to, and selectively translatable and rotatable with respect to, a corresponding one of the branches;
lengths of flexible conduit;
a flexible dress package having a boom sleeve that circumscribes the limb and routes the lengths of flexible conduit to the tool modules; and
a configuration tool having a cam latch, an actuator, and a pair of actuating fingers that are moveable via the actuator, wherein the first and second branch joints each defines locator openings that are engaged via the actuating fingers, the cam latch is moveable via the actuator to engage one of the cam locks, and a movement of the cam latch in respective first and second directions clamps and unclamps the cam lock.

8. The reconfigurable end-effector assembly of claim 7, wherein the flexible dress package includes a manifold to which is routed all of the lengths of flexible conduit.

9. The reconfigurable end-effector assembly of claim 7, further comprising a plurality of flexible snap-in sleeves, each of which is positioned within a respective one of the tandem branch joint assemblies.

10. The reconfigurable end-effector assembly of claim 9, wherein each of the flexible snap-in sleeves has a pair of flanges which retain the first and second branch joints to each other.

11. The reconfigurable end-effector assembly of claim 7, wherein the flexible dress package includes a branch rail defining a U-channel which receives a corresponding one of the lengths of flexible conduit.

* * * * *